US00RE35139E

United States Patent [19]

Oberholzer

[11] E Patent Number: Re. 35,139

[45] Reissued Date of Patent: Jan. 2, 1996

[54] RING TRAVELLER FOR A BEVELLED FLANGED RING

[75] Inventor: Franz Oberholzer, Fehraltorf, Switzerland

[73] Assignee: Bracker AG, Pfaffikon, Switzerland

[21] Appl. No.: 341,909

[22] Filed: Nov. 15, 1994

Related U.S. Patent Documents

Reissue of:

[64] Patent No.: 5,297,380
Issued: Mar. 29, 1994
Appl. No.: 917,388
Filed: Jul. 23, 1992

[30] Foreign Application Priority Data

Aug. 13, 1991 [CH] Switzerland ..... 02388/91

[51] Int. Cl.[6] ..... D01H 7/60

[52] U.S. Cl. ..... 57/125

[58] Field of Search ..... 57/125, 119

[56] References Cited

U.S. PATENT DOCUMENTS 2,831,313 4/1958 Burns et al. .
3,159,963 12/1964 Zakharov .
4,185,449 1/1980 Eadie et al. .
4,481,764 11/1984 Würmli .

FOREIGN PATENT DOCUMENTS 0020365 5/1980 European Pat. Off. .
0084615 8/1982 European Pat. Off. .
1284338 11/1968 Germany ..... 57/119
7814259 9/1978 Germany .

*Primary Examiner*—Joseph J. Hail, III
*Attorney, Agent, or Firm*—Cushman, Darby & Cushman

[57] ABSTRACT

A ring traveller for use with a bevelled flanged ring of a ring spinning machine or a ring doubling and twisting machine, wherein the ring traveller comprises: (a) first and second traveller arms arranged approximately the same direction, the first traveller arm being longer than the second traveller arm and having a counterface intended for bearing on the running surface of the ring, and the second traveller arm has an inwardly angled engagement part intended for engagement with an annular shoulder; and (b) a connecting part extending between the traveller arms and comprising first and second straight portions extending towards each other at an obtuse angle, whereof the first straight portion adjoins the first longer traveller arm via an arcuate portion and a circular arcuate portion interconnects the first and second straight portions and forms an apex whose distance from the first traveller arm is greater than its distance from the second traveller arm. The traveller has a longitudinal extent which amounts to approximately [ 140%] *210–215%* of a first distance between the first and second traveller arms, and the part distance from the first traveller arm to an axis passing through the apex and disposed approximately parallel to the first and second traveller arms amounts to approximately 54% of said first distance.

7 Claims, 3 Drawing Sheets

RING TRAVELLER FOR A BEVELLED FLANGED RING

Matter enclosed in heavy brackets [ ] appears in the original patent but forms no part of this reissue specification; matter printed in italics indicates the additions made by reissue.

FIELD OF THE INVENTION

The invention concerns a ring traveller for a bevelled ring of a ring spinning machine or a ring doubling and twisting machine.

PRIOR ART

A ring traveller of this kind is known from German Utility Model 78 14 259. The two straight portions of the connecting part which are interconnected by a circular arcuate portion extend at equal angles to the parallel traveller arms and have the same length. Thus the connecting part has a symmetrical shape, with the object of enlarging the distance of the tip or apex from the top of the ring to create a sufficiently large passage for the yarn. The experience gained in operating with such travellers has not produced any better results, in particular in the processing of short staple fibers, than those obtained with travellers where the traveller arms are combined by a semicircular connecting part.

U.S. Pat. No. 4,481,764, discloses a ring traveller wherein the yarn path is provided with a less constricted path as compared with the above mentioned traveller with a symmetrical design of the connecting part restricting the passing of the yarn. At the same time, in said U.S. Patent the connecting part has an asymmetrical shape, with a first portion designed as a quadrant and a second straight portion adjoining the longer traveller arm, which latter portion adjoins the longer traveller arm. As a result of the more free passage created with the quadrant, the loading of the connecting part by the yarn is distributed over a larger area. On the other hand, the changing running conditions of the yarn may lead to instability in the traveller, in particular at higher speeds.

Applicants have for some time already been marketing travellers for bevelled flanged rings under the designation "SU-BM" which also have an asymmetrically shaped connecting part with a comparatively high degree of load spreading. The portions directly adjoining the circular arcuate portion on both sides are here formed by straight portions of different lengths, whereof the longer of the two adjoins the longer traveller arm. In this arrangement, the asymmetry serves the purpose of increasing the yarn transit or letting it take place at a point more remote from the top of the ring. Admittedly, the dust deposits encountered in operation show that considerable yarn abrasion occurs on the ring and that thus the desired object is not attained. The above mentioned traveller is also unsatisfactory since the connecting part requiring a relatively large amount of wire material necessitates an extension of the traveller at the base, so as to obtain an equalization of the mass distribution. Accordingly, the traveller must, for a given total mass, be made of relatively thin wire, which is not conducive to the distribution and dissipation of the heat of friction and thus precludes high output rates.

OBJECTS OF THE INVENTION

It is a first object of the invention to provide an increase in output, in particular in the processing of short staple fibers.

It is a further object of the invention to give the traveller a form optimizing its position relative to the ring during its rotation thereon, both as regards its own running behaviour and with reference to the yarn flow.

SUMMARY OF THE INVENTION

Accordingly the present invention provides a ring traveller for use with a bevelled flanged ring of a ring spinning machine or a ring doubling and twisting machine, said ring having a running face, wherein said ring traveller comprises:

(a) first and second traveller arms arranged in approximately the same direction, said first traveller arm being longer than said second traveller arm and having a counterface intended for bearing on the running surface of the ring, and said second traveller arm has an inwardly angled engagement part intended for engagement with an annular shoulder, and (b) a connecting part extending between the traveller arms and comprising first and second straight portions extending towards each other at an obtuse angle, whereof said first straight portion adjoins said first longer traveller arm via an arcuate portion and a circular arcuate portion interconnects said first and second straight portions and forms an apex whose distance from said first traveller arm is greater than its distance from said second traveller arm;

and wherein (c) the traveller has a longitudinal extent which amounts to approximately [140%] *210–215%* of a first distance between the said first and second traveller arms, and (d) the part distance from said first traveller arm to an axis passing through the apex and disposed approximately parallel to said first and second traveller arms amounts to approximately 54% of said first distance.

It is generally known that the position of the traveller during rotation on the ring relative thereto is of great importance both for the spinning process and for the wear of the traveller, which is here the primary concern.

On the other hand, the present invention is based on recognition of the fact that it is possible to increase the output to an unexpected extent, without reducing the service life of the traveller, by influencing this position by means of the design of the main dimensions of the traveller.

In a preferred embodiment of the traveller according to the invention, the design of the connecting part for influencing the position of the yarn transit on the traveller and the throughflow conditions also contributes to a further increase in output.

Because of the indicated ratio between the length and width of the traveller according to the invention, its centre of gravity comes to be relatively high on the ring and at a relatively large distance from its running surface.

The chosen asymmetrical position of the yarn passage which is exactly defined by the connecting part in the radial direction has the extremely advantageous consequence that in rotation, the traveller assumes, relative to a radial plane of the ring, both a reduced angle of inclination (viewed in elevation) as well as a smaller angle of deflection (viewed in plan). it may be assumed that this traveller position is due, inter alia, to the comparatively short lever arm between the point of application of the yarn pulling force and the position of the centre of gravity of the traveller deriving from its length/breadth ratio. The comparatively small distance of the point of application of the braking forces of the ring from the centre of gravity may also have a favourable effect as regards the small angle of inclination.

However, as regards the angle of deflection, it is the width of the traveller in the yam path that is of decisive importance. This width derives from on .the one hand the relatively large angle formed by the straight parts, and on the other hand the comparatively large radius of the circular arcuate portion.

As a result of the exactly defined yam passage or of the yarn pull which is thus always acting uniformly, the traveller according to the invention keeps a stable position. Because of this, it is possible to utilize the clear traveller cross-section to better effect and to economise on the length of wire because of a corresponding reduction of the main dimensions. With the same required weight of the traveller, it is accordingly possible to transfer a higher proportion of the weight into the material cross-section of the wire, or of the traveller formed therefrom: The comparatively large material cross-section promotes the rapid distribution and dissipation of the heat of friction in the traveller. Because of this, and because of the uniform wear of the counterface due to the smaller angle of deflection, there ensues a considerable prolongation of its service life.

The position of the traveller on the ring also produces an optimum utilization of the dimensions for the yarn transit created by the design of the connecting part, so that the risk of yarn friction on the top of the ring is avoided in spite of the shortening of the clear height. Here it should be noted that the relatively large angle between the straight portions of the connecting part, together with the large radius of the circular arcuate portion does, in any case, allow the yarn to pass near the apex of the connecting part.

The results of the operations with reference to the desired objects confirm that the considerations determining the design of the traveller according to the invention are correct.

BRIEF DESCRIPTION OF THE DRAWINGS

These and further objects and advantages of the invention will now become apparent from a study of the following detailed description of a preferred embodiment thereof, given merely by way of example and with reference to the attached drawings. In the drawings.

DETAILED DESCRIPTION OF A PREFERRED EMBODIMENT

Figure 1:
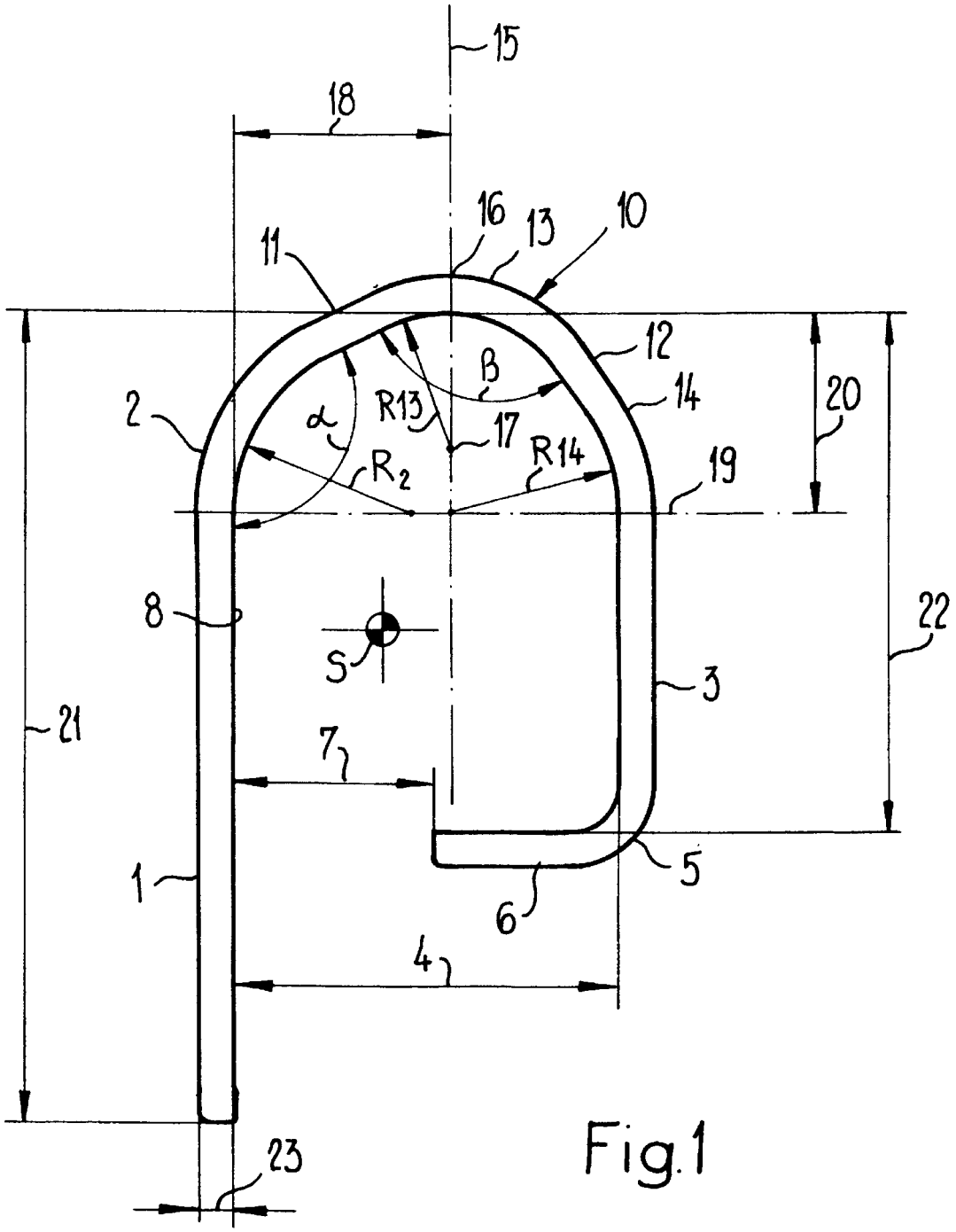
FIG. 1 shows a ring traveller in elevation.

FIG. 1 shows a longer, straight traveller arm which, with reference to the position on a ring is the inner one. This which is followed by a shorter, straight traveller arm 3 via an arcuate portion 2, as well as a connecting part generally identified as 10. The arcuate portion 2 has the radius $R_2$. The traveller arms 1 and 3 extend approximately parallel to each other at a distance 4. This distance 4 is taken up below as the reference value for the dimensions on the traveller. On the side of the traveller arm 3 that is remote from the connecting part, said arm is connected with an engagement pan 6 via quadrant arcuate part 5 with a radius $R_5$. The engagement part 6 which accordingly extends at right angles to the traveller arms 1 and 3 delimits, together with the longer arm 1, a mounting gap 7.

The connecting part 10 is formed by two straight portions 11 and 12, a circular arcuate portion 13 lying between them, and an arcuate section 14. In this arrangement, the straight portion 11 is directly joined to the arcuate portion 2 and forms an angle a with the traveller arm 1, whilst the angle β is formed with the other straight portion 12. As emerges from FIG. 1, the circular arcuate portion 13 forms an apex 16 of the connecting part 10 at the intersection of an axis 15. The axis 15 which thus contains the centre 17 for the radius $R_{13}$ extends parallel to the traveller arms 1 and 3 and is interspaced from the longer arm 1 by a dimension 18. The apex 16 is spaced at a distance 20 with reference to a straight line 19 which extends at right angles to the axis 15 and interconnects the ends of the traveller arms 1 and 3 adjoining the connecting part 10. The distance between the outer side of the apex 16 and the more remote end of the traveller arm 1 is designated 21, and the distance from the inner side of this apex from the engagement part 4 is designated 22. This dimension 22 obviously corresponds to the clear height of the traveller. The thickness of the traveller wire is indicated at 23. The centre of gravity of the ring lies at S.

In a preferred development, the traveller formed of steel wire has a half-round cross-section and the rounded side is directed inwards so that it forms the inner side. Travellers with such a cross-sectional shape are known. In the zone of the traveller arm as well as of the arcuate portion 2, the rounded inner side of the traveller forms the counterface 8 for cooperation with the running surface of a bevelled flanged ring. This will be discussed in greater detail in conjunction with the explanation of FIGS. 2–4.

In the Table given below, the values of the dimensions set out are indicated as relative values, unless they are angles, and in the case of a preferred example of the embodiment, as desired values in absolute figures. They all refer to the inner shape of the traveller.

TABLE

| Designation | Percentage Value | Absolute Desired Value |
|---|---|---|
| Dimension 4 | 100 | 2.9 mm |
| Dimension 18 | 53–55 | 1.55 mm |
| Dimension 20 | 48–52 | 1.5 mm |
| Dimension 21 | 210–215 | 6.2 mm |
| Dimension 22 | 135–140 | 4.0 mm |
| Gap 7 | 54–58 | 1.6 mm |
| Radius $R_2$ | 38–45 | 1.2 mm |
| Radius $R_{13}$ | 31–38 | 1.05 mm |
| Radius $R_{14}$ | 38–45 | 1.2 mm |
| Angle α | 120°–130° | 128° |
| Angle β | 100°–115° | 108° |

From FIG. 1 and the values of the Table, it will be seen that the traveller according to the invention has a relatively large width (dimension 4) relative to its length (dimension 21) and the indication of the position of the center of gravity shows that the distances from the point of application of the yarn pull, which may be assumed in a simplified manner to lie at the apex 16, are small both in the horizontal and vertical directions. FIG. 1 also shown the asymmetrical position of the apex in the connecting part 10.

It remains to be added that the thickness 23, and the width of the wire cross-section, are chosen according to the traveller weight required for the processing of a given yarn, and in the case of the traveller according to the invention, it can, like the width, have a high value because of the short length of the wire. The advantages of such a design have already been referred to above.

Figure 2:
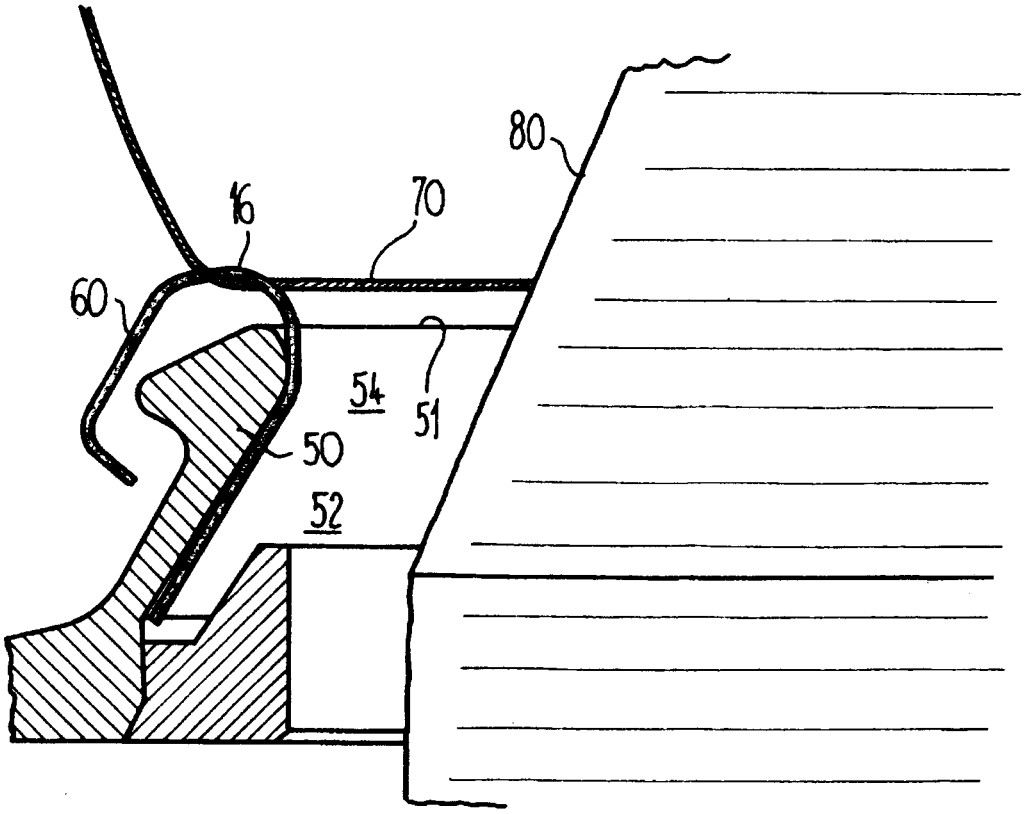
FIG. 2 shows the conditions obtained during the spinning operation with a traveller according to FIG. 1.

Operating tests were undertaken with travellers of the indicated dimensions on bevelled flanged rings 50 of the kind represented in FIG. 2. In this FIG. 2, the yarn 70 processed by the traveller 60 is represented together with the cop 80. The rings 50 had inner diameters of 36–45 mm, and an angle of 33° which is typical for the inclination of the slight convex curvature of the running surface portion 52.

The radius of the circular curvature of the upper running surface portion 54 amounted to 1 mm.

In the operating tests effected under working conditions, yarns of counts 16–80 of short staple fibres were produced with great success over the whole range, in that it was possible to increase the output rate by 10–30% as compared with the processing with C-shaped travellers and T-shaped ring cross-sections.

Figure 3:
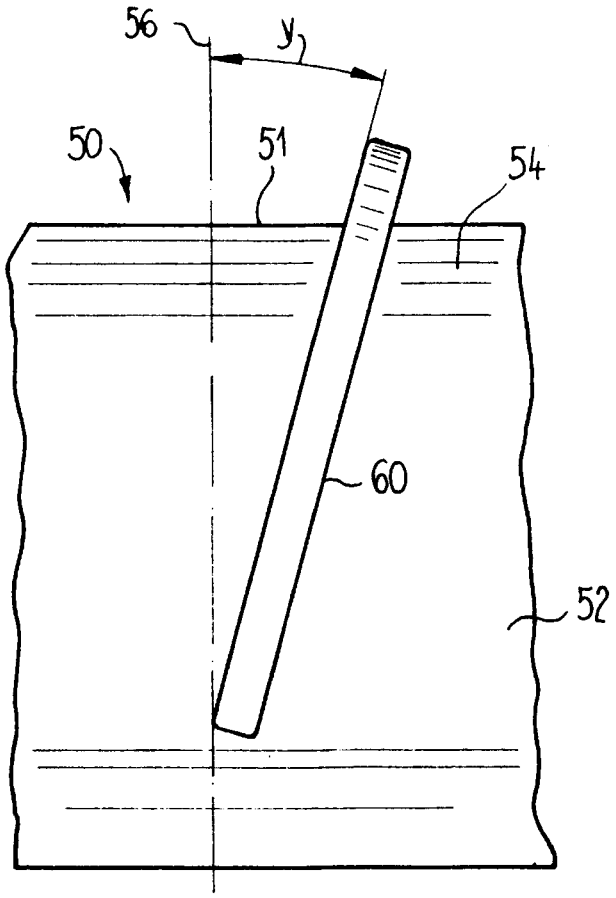
FIGS. 3 and 4 show representations of a traveller according to FIG. 1, when placed on a ring.
Figure 4:
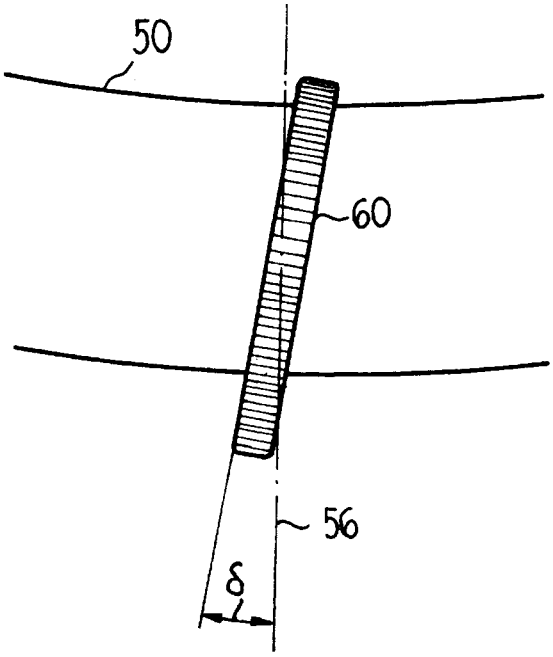

FIGS. 3 and 4 show the actual position of a traveller 60 according to the invention on a ring 50 during the spinning operations. The inclination of the traveller 60 relative to an axial plane 56 of the ring 50 may be seen in FIG. 3, which represents the traveller as viewed from the inside of the ring. This shows the importance of a small angle of inclination $\tau$ for an optimum utilization of the traveller cross-section with reference to its clear height 22 and in particular, for an adequate yarn transit above the top 51 of the ring 50 for given dimensions of the traveller 60. The free cross-section between the top of the ring and the connecting part 10 which can be used for the passing of the yarn obviously becomes the greater the more the angle $\tau$ can be kept to a low value. With the traveller according to the invention, it is possible to keep this angle below 20° and with the indicated dimensions of the preferred example of the embodiment, an angle of 18° was ascertained.

The representation of FIG. 4, showing the position of the traveller in plan relative to the axial plane 56 of the ring 50, clearly shows that the traveller according to the invention is only subjected to a small deflection under the effect of the yarn pull, thanks to the design described. Consequently, the counterface 8 (FIG. 1) of the traveller bears with a wide bearing surface on the running surface portion 52 of the ring. Thereby the distribution of the heat of friction is promoted and its dissipation is facilitated. With the traveller according to the invention, values of approximately 10° were ascertained for the angle of deflection $\delta$.

With reference to the represented shape of the traveller, a modification is possible, in particular in that the longer traveller arm 1 need not necessarily be straight, but it may have a slight curvature in such a way that the counterface has a convex curvature. Thereby, it also becomes possible to use the traveller according to the invention also on rings whose running surface portion has a straight generatrix, that is to say, it forms a circular conical surface.

Travellers according to the invention can of course be brought into service arranged on stock or magazine rods, and remain on the rods until they are used. To keep the travellers arranged on the rods in a uniform orientation and position in the peripheral direction, it is expedient for the rods to have a cross-section adapted to the inner shape and size of the traveller, to the extent that provision is made for corresponding surfaces associated with the traveller arms (for example, or 3 in FIG. 1). Preferably, the distance between these surfaces should not be smaller than the distance 4 shortened by one traveller wire thickness so as to prevent adjoining travellers from becoming tangled up in each other. For adaptation to the inner shape, it is possible for the appropriate corners of, for example, a generally rectangular rod cross-section to be rounded off.

I claim:

1. In a ring traveller for use with a bevelled flanged ring of a ring spinning machine or a ring doubling and twisting machine, said ring having a running surface, wherein said ring traveller comprises:

(a) first and second traveller arms arranged in approximately the same direction, said first traveller arm being longer than said second traveller arm and having a counterface intended for bearing on said running surface of the ring, and said second traveller arm has an inwardly angled engagement part intended for engagement with an annular shoulder, and (b) a connecting part extending between the traveller arms and comprising first and second straight portions extending towards each other at an obtuse angle, whereof said first straight portion adjoins said first longer traveller arm via an arcuate portion and a circular arcuate portion interconnects said first and second straight portions and forms an apex whose distance from said first traveller arm is greater than its distance from said second traveller arm;

the improvement wherein (c) the traveller has a longitudinal extent which between the said first [140%] *210–215%* traveller arms, and (d) the part distance from said first traveller arm to an axis passing through the apex and disposed approximately parallel to said first and second traveller arms amounts to approximately 54% of said first distance.

2. A ring traveller according to claim 1, wherein the height of said apex above an imaginary straight connecting line between the ends of said first and second traveller arms adjoining said connecting part amounts to approximately 50% of said first the distance, wherein the radius of said circular arcuate portion, whose centre lies on said axis, amounts to approximately 35% of said first distance, and wherein the angle formed by the said first and second portions of said connecting part is approximately 110° and the angle between said first traveller arm and said first straight portion is approximately 125°.

3. A ring traveller according to claim 1, wherein the radius of said arcuate portion amounts to approximately 41% of said first distance.

4. A ring traveller according to claim 1, wherein said first traveller arm has a slight convex curvature on the side facing said counterface.

5. In combination a ring traveller according to claim 1, and a bevelled flanged ring on which said ring traveller is mounted, wherein the radius of the upper running portion for the arcuate portion of the traveller amounts to approximately 34% of the distance between said first and second traveller arms.

6. The combination according to claim 5, wherein the ring has upper and lower running surface portions and the angle formed by an imaginary straight connecting line between the end zones of the lower running surface portion with the axis of the ring amounts to 33°.

7. The combination according to claim 5, wherein one of said first and second traveller arms has a convex curvature on its counterface, and wherein said ring has a lower running surface portion which has a straight generatrix.

* * * * *

UNITED STATES PATENT AND TRADEMARK OFFICE

CERTIFICATE OF CORRECTION

PATENT NO. : Re. 35,139

DATED : January 2, 1996

INVENTOR(S) : OBERHOLZER

It is certified that error appears in the above-identified patent and that said Letters Patent is hereby corrected as shown below:

Column 6, lines 23-24 should be deleted and replaced by:

--(c) the traveller has a longitudinal extent which amounts to approximately [140%] *210-215%* of a first distance between the said first and second traveller arms, and--.

Signed and Sealed this

Second Day of April, 1996

*Attest:*

*Attesting Officer*

Bruce Lehman

BRUCE LEHMAN

*Commissioner of Patents and Trademarks*